(12) United States Patent
Honkanen

(10) Patent No.: US 11,589,029 B2
(45) Date of Patent: Feb. 21, 2023

(54) 3D IMAGING SYSTEM FOR RGB-D IMAGING

(71) Applicant: Microvision, Inc., Redmond, WA (US)

(72) Inventor: Jari Honkanen, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 968 days.

(21) Appl. No.: 16/397,258

(22) Filed: Apr. 29, 2019

(65) Prior Publication Data

US 2020/0344459 A1 Oct. 29, 2020

(51) Int. Cl.
| | | |
|---|---|---|
| H04N 13/254 | (2018.01) | |
| H04N 13/236 | (2018.01) | |
| H04N 13/296 | (2018.01) | |
| G01S 17/89 | (2020.01) | |
| H04N 5/232 | (2006.01) | |
| G01S 17/42 | (2006.01) | |
| H04N 13/239 | (2018.01) | |
| G01S 17/86 | (2020.01) | |

(52) U.S. Cl.
CPC .......... *H04N 13/254* (2018.05); *G01S 17/42* (2013.01); *G01S 17/86* (2020.01); *G01S 17/89* (2013.01); *H04N 5/23296* (2013.01); *H04N 13/236* (2018.05); *H04N 13/239* (2018.05); *H04N 13/296* (2018.05)

(58) Field of Classification Search
CPC .................................................... H04N 13/254
USPC ........................................................ 356/5.01
See application file for complete search history.

(56) References Cited

U.S. PATENT DOCUMENTS

| | | | | |
|---|---|---|---|---|
| 2010/0309288 A1* | 12/2010 | Stettner | .................... | H04N 5/33 |
| | | | | 348/E13.001 |
| 2014/0194747 A1* | 7/2014 | Kruglick | .............. | A61B 1/0638 |
| | | | | 600/178 |
| 2015/0336271 A1* | 11/2015 | Spicer | .................. | B23K 37/047 |
| | | | | 228/9 |
| 2016/0240579 A1* | 8/2016 | Sun | ..................... | H04N 9/04559 |
| 2016/0381345 A1* | 12/2016 | Wu | ....................... | H04N 13/239 |
| | | | | 348/36 |
| 2017/0070714 A1* | 3/2017 | Honkanen | .............. | G09G 3/025 |
| 2017/0374342 A1* | 12/2017 | Zhao | .................... | H04N 13/128 |
| 2018/0284286 A1* | 10/2018 | Eichenholz | ............. | G01S 17/89 |

* cited by examiner

*Primary Examiner* — Amir Shahnami
(74) *Attorney, Agent, or Firm* — Kevin D. Wills

(57) ABSTRACT

A 3D imaging system includes a camera to capture visible images, and a MEMS device with a scanning mirror that sweeps a beam in two dimensions. Actuating circuits receive angular extents and offset information and provide signal stimulus to the MEMS device to control the amount and direction of mirror deflection on two axes. The scan angle and offset information may be modified in response to camera properties.

19 Claims, 14 Drawing Sheets

US 11,589,029 B2

3D IMAGING SYSTEM FOR RGB-D IMAGING

FIELD

The present invention relates generally to imaging systems, and more specifically to 3D imaging systems.

BACKGROUND

Scanning 3D imaging systems typically scan a pulsed light beam in a raster pattern in a field of view and measure times-of-flight (TOF) of received reflections. The spatial resolution of the resulting depth map is typically a function of the distance between the rangefinding system and the illuminated target features (reflection points) within the field of view, as well as the angular extents of the scanner deflection.

DESCRIPTION OF EMBODIMENTS

Figure 1:
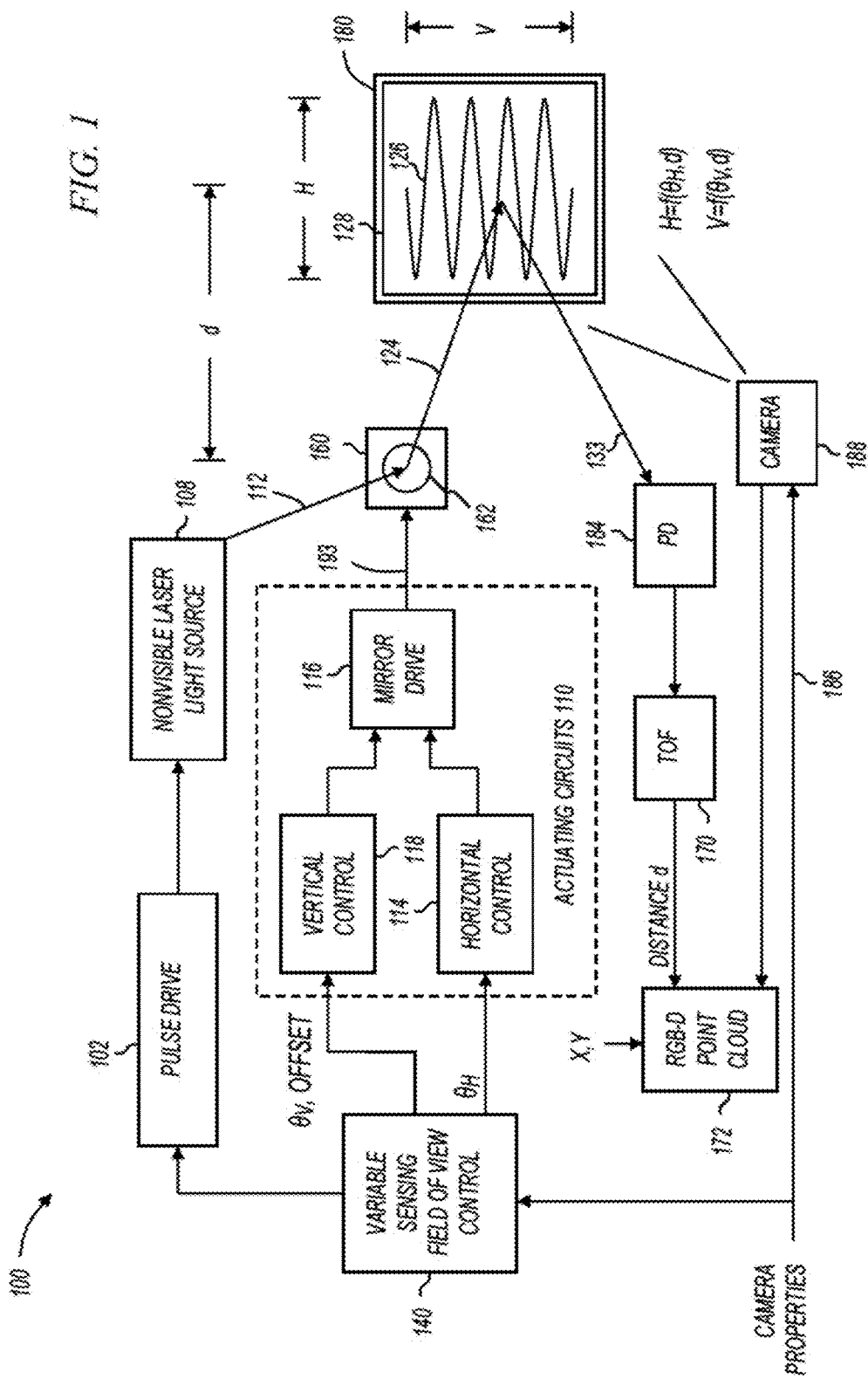
FIG. 1 shows a 3D imaging system in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a 3D imaging system in accordance with various embodiments of the present invention. System 100 includes pulse drive circuit 102, nonvisible laser light source 108, microelectromechanical system (MEMS) device 160 having scanning mirror 162, and actuating circuits 110. Actuating circuits 110 include vertical control component 118, horizontal control component 114, and mirror drive component 116. System 100 also includes photodetector (PD) 184, time-of-flight (TOF) detection circuit 170, camera 188, RGB-D point cloud storage circuit 172, and variable sensing field of view controller 140.

Nonvisible laser light source 108 may be a laser light source such as a laser diode or the like, capable of emitting a laser beam 112. The beam 112 impinges on a scanning mirror 162 to generate a controlled output beam 124. In some embodiments, optical elements are included in the light path between light source 108 and mirror 162. For example, 3D imaging system 100 may include collimating lenses, dichroic mirrors, or any other suitable optical elements.

Actuating circuits 110 provides one or more drive signal(s) 193 to control the angular motion of scanning mirror 162 to cause output beam 124 to generate a raster scan 126 in a sensing field of view 128. In operation, light source 108 produces light pulses and scanning mirror 162 reflects the light pulses as beam 124 traverses raster scan 126.

In some embodiments, raster scan 126 is formed by combining a sinusoidal component on the horizontal axis and a sawtooth component on the vertical axis. In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the present invention are not limited by the waveforms used to control the vertical and horizontal sweep or the resulting raster pattern.

MEMS device 160 is an example of a scanning mirror assembly that scans light in two dimensions. In some embodiments the scanning mirror assembly includes a single mirror that scans in two dimensions (e.g., on two axes). Alternatively, in some embodiments, MEMS device 160 may be an assembly that includes two scan mirrors, one that deflects the beam along one axis, and another that deflects the beam along a second axis largely perpendicular to the first axis.

Pulse drive circuit 102 includes driver circuits that accept pulse power levels and pulse timing signals from variable sensing field of view controller 140. Pulse drive circuit 102 produces current signals with appropriate power levels and timing to drive nonvisible laser light source 108 and to produce laser light pulses scanned into a sensing field of view.

In some embodiments, nonvisible laser light source 108 sources nonvisible light such as infrared (IR) light. In these embodiments, PD 184 is able to detect the same wavelength of nonvisible light. For example, in some embodiments, laser light source 108 may be an IR laser diode that produces light with a wavelength of substantially 808 nanometers (nm). The wavelength of light is not a limitation of the present invention. Nonvisible laser light source 108 may produce any wavelength of nonvisible light without departing from the scope of the present invention. In some embodiments PD 184 may be implemented by a PIN photodiode, a Silicon photomultiplier (SiPM), or an avalanche photodiode (APD).

Although variable sensing field of view of view controller 140 is shown driving nonvisible laser light source 108, this is not a limitation of the present invention. For example, in some embodiments, variable sensing field of view controller 140 drives one or more visible laser light sources, and PD 184 is sensitive to the visible wavelengths used.

Time-of-flight (TOF) detection circuit 170 receives IR laser light pulses that are reflected off of objects in the sensing field of view. The points in the sensing field of view at which the light is reflected are referred to herein as "reflection points." A grouping of reflection points and their corresponding distances are referred to herein as a "point cloud." TOF detection circuit 170 compares the timing of a received reflected IR pulse with timing of the IR pulse emitted from nonvisible laser light source 108 to determine the TOF of the IR pulse, thereby measuring the distance to the reflection point from which the IR light pulse reflected.

TOF detection circuit 170 may be implemented using any suitable circuits. For example, in some embodiments, TOF detection circuit 170 includes an analog integrator that is reset when the IR pulse is launched, and is stopped when the reflected pulse is received. TOF detection circuit 170 may also include an analog-to-digital converter to convert the analog integrator output to a digital value that corresponds to the time-of-flight (TOF) of the IR laser pulse, which in turn corresponds to the distance between system 100 and the reflection point from which the light pulse was reflected.

Camera 188 captures visible images and converts the images to data representing colors in pixels. For example, in some embodiments, camera 188 is a CMOS detector that outputs red, green, blue (RGB) data for each pixel captured. Camera 188 has a pointing angle such that the camera captures an image from within imaging field of view 180. As shown in FIG. 1, imaging field of view 180 may substantially overlap with sensing field of view 128, although this is not a limitation of the present invention. For example, in some embodiments, imaging field of view 180 may partially overlap sensing field of view 128 or exactly match sensing field of view 128. Also for example, in some embodiments, imaging field of view 180 may be completely encompassed by sensing field of view 128, and in other embodiments, sensing field of view 128 may be completely encompassed by imaging field of view 180. These and other embodiments are described further below.

RGB-D point cloud storage circuit 172 receives image data from camera 188 and receives distance data from TOF detection circuit 170. In some embodiments, the image data is in the form of red, green, and blue (RGB) data from each pixel captured in the imaging field of view, and the distance data (D) is in the form of a three-tuple (x,y,d) that includes the distance d and an X,Y pair representing the reflection point within the sensing field of view. In some embodiments, pixel locations for image data and reflection points for distance data coincide and the RGB-D point cloud data is provided as a series of tuples describing pixel locations, RGB data and depth data. In other embodiments, pixel locations for image data and reflection points for distance data do not necessarily coincide and so some pixel locations include RGB data and other pixel locations include depth data. In still further embodiments, depth data and/or RGB data is interpolated to provide RGB-D data for every pixel location represented in RGB-D point cloud storage device 172.

RGB-D point cloud storage circuit 172 may be implemented using any suitable circuit structure. For example, in some embodiments, RGB-D point cloud storage circuit 172 is implemented in a dual port memory device that can be written on one port and read on a second port. In other embodiments, RGB-D point cloud storage circuit 172 is implemented as data structures in a general purpose memory device. In still further embodiments, RGB-D point cloud storage circuit 172 is implemented in an application specific integrated circuit (ASIC).

In operation, camera 188 receives properties on node 186 that determine various aspects of camera operation. These properties may be provided by a system controller, a user, or any other source of camera property information. Examples of camera properties include optical zoom level, digital zoom level, on/off state, aspect ratio, aperture setting, and the like. In response to the camera properties, camera 188 may change operational characteristics. For example, camera 188 may modify an optical and/or digital zoom level resulting in a change in the size of imaging field of view 180. Also for example, camera 188 may modify an aspect ratio of the imaging field of view 180 in response to camera properties on node 186. Camera 188 may modify the size, shape, location, or any other property of imaging field of view 180 based on camera properties provided on node 186 without departing from the scope of the present invention.

Variable sensing field of view controller 140 commands nonvisible laser light source 108 to emit nonvisible laser light pulses at one or more X,Y locations of raster scan 126 to measure the distance to one or more reflection points within the sensing field of view, and may also modify the angular extents ($\theta_H, \theta_V$) and offset to modify the sensing field of view to accomplish various results.

Variable sensing field of view controller 140 is implemented using functional circuits such as phase lock loops (PLLs), filters, adders, multipliers, registers, processors, memory, and the like. Accordingly, variable sensing field of view controller 140 may be implemented in hardware, software, or in any combination. For example, in some embodiments, variable sensing field of view controller 140 is implemented in an application specific integrated circuit (ASIC). Further, in some embodiments, some of the faster data path control is performed in an ASIC and overall control is software programmable.

The resultant sensing field of view 128 has a height (V) and a width (H) that are a function of the distance (d) from scanning mirror 162 to the point at which the height and width are measured, as well as the angular extents of mirror deflection. As used herein, the term "angular extents" refers to the total angle through which the mirror deflects rather than an instantaneous angular displacement of the mirror.

The width of the sensing field of view (H) is a function of the distance (d) and the horizontal angular extents ($\theta_H$). This relationship is shown in FIG. 1 as $$H = f(\theta_H, d). \quad (1)$$

The height of the sensing field of view (V) is a function of the distance (d) and the vertical angular extents ($\theta_V$). This relationship is shown in FIG. 1 as $$V = f(\theta_V, d). \quad (2)$$

In various embodiments of the present invention, either or both of the vertical and horizontal angular extents are dynamically modified during operation of the 3D imaging system to modify the size, shape, and/or location of the sensing field of view. Also in some embodiments, an offset is applied to the vertical mirror displacement to dynamically modify the pointing angle of the sensing field of view.

In some embodiments, variable sensing field of view controller 140 modifies angular extents and/or offsets to change the size, shape, and/or location of sensing field of view 128 in response to camera properties. For example, in some embodiments, the size, shape, and/or location of sensing field of view 128 is modified in response to a change in an optical zoom level, a digital zoom level, an aspect ratio, an on/off state, or other property of camera 188. In some embodiments, sensing field of view 128 may be modified so that it overlaps or continues to overlap imaging field of view 180. In other embodiments, sensing field of view 128 may be modified so that it exactly matches imaging field of view 180. Also for example, in some embodiments, sensing field of view 128 may be modified so that imaging field of view 180 completely encompasses sensing field of view 128, and in other embodiments, sensing field of view 128 may be modified so that sensing field of view 128 completely encompasses imaging field of view 180.

As shown in FIG. 1, horizontal control component 114 receives signal stimulus that represents the horizontal angular extents, and vertical control component 118 receives signal stimulus that represents the vertical angular extents and offset. The angular extents and offset signal stimulus may be provided on multiple signal lines (e.g., dedicated signal lines, or a shared bus) or may be provided on a single signal line (e.g., a serial bus). The manner in which signal stimulus is provided is not a limitation of the present invention.

Horizontal control component 114 and vertical control component 118 receive the signal stimulus and produce signals to effect actual mirror movement through the specified angles with the specified offset. The signals produced by vertical control component 118 and horizontal control component 114 are combined by mirror drive component 116, which drives MEMS device 160 with a composite signal on node 193. In some embodiments that include two scan mirrors, MEMS device 160 is driven directly by signals produced by vertical control component 118 and horizontal control component 114.

Actuating circuits 110 are implemented using functional circuits such as voltage or current sources, op-amps, bridge circuits (and all in open or closed loop control with or without position sensing circuits), phase locked loops (PLLs), filters, adders, multipliers, registers, processors, memory, and the like. Accordingly, actuating circuits 110 may be implemented in hardware, software, or in any combination. For example, in some embodiments, actuating circuits 110 are implemented in an application specific integrated circuit (ASIC). Further, in some embodiments, some of the faster data path control is performed in an ASIC and overall control is software programmable.

Figure 2:
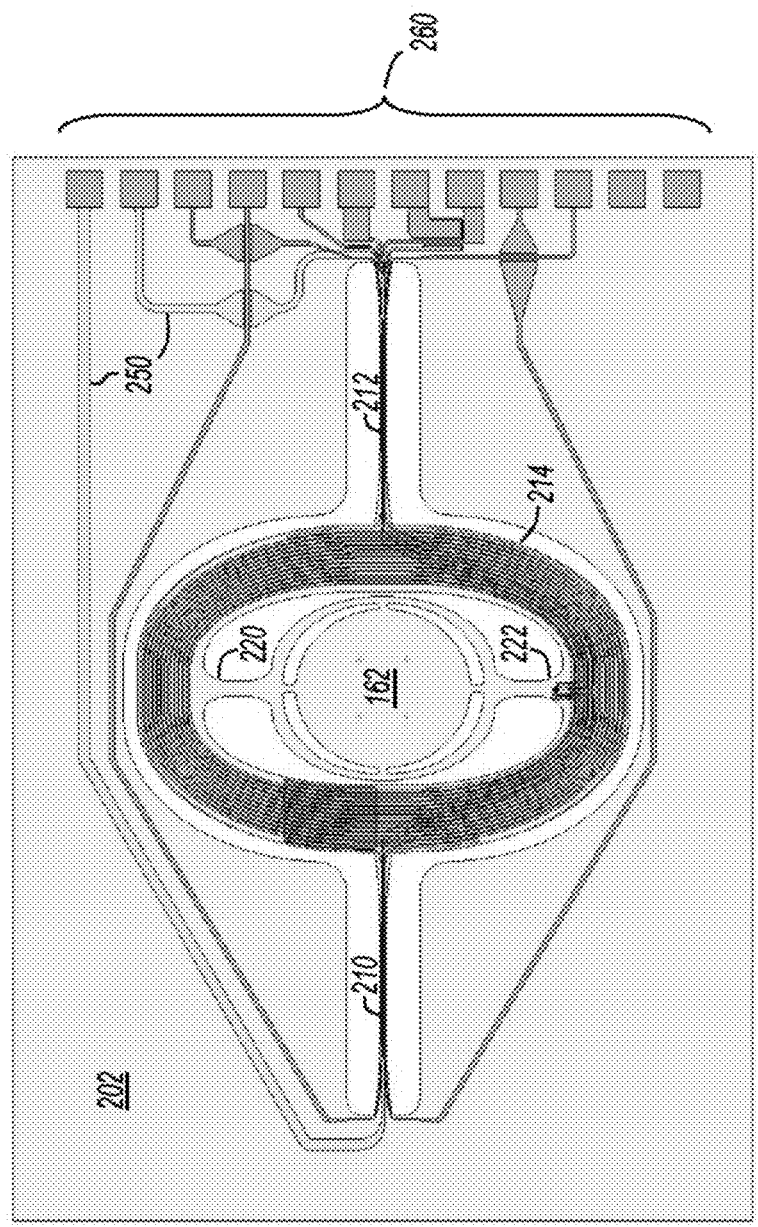
FIG. 2 shows a plan view of a microelectromechanical system (MEMS) device with a scanning mirror.

FIG. 2 shows a plan view of a microelectromechanical system (MEMS) device with a scanning mirror. MEMS device 160 includes fixed platform 202, scanning platform 214 and scanning mirror 162. Scanning platform 214 is coupled to fixed platform 202 by flexures 210 and 212, and scanning mirror 162 is coupled to scanning platform 214 by flexures 220 and 222. Scanning platform 214 has a drive coil connected to drive lines 250, which are driven by a composite signal provided on node 193 from actuating circuits 110 (FIG. 1). Current driven into drive lines 250 produces a current in the drive coil. Two of the interconnects 260 are coupled to drive lines 250.

In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 214, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 210 and 212 form a pivot axis. Flexures 210 and 212 are flexible members that undergo a torsional flexure, thereby allowing scanning platform 214 to rotate on the pivot axis and have an angular displacement relative to fixed platform 202. Flexures 210 and 212 are not limited to torsional embodiments as shown in FIG. 2. For example, in some embodiments, flexures 210 and 212 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Mirror 162 pivots on a first axis formed by flexures 220 and 222, and pivots on a second axis formed by flexures 210 and 212. The first axis is referred to herein the horizontal axis, and the second axis is referred to herein as the vertical axis. The distinction between vertical and horizontal is somewhat arbitrary, since a rotation of the display system will cause a rotation of the two axes. Accordingly, the various embodiments of the present invention are not to be limited by the terms "horizontal" and "vertical."

In some embodiments, scanning mirror 162 scans at a mechanically resonant frequency on the horizontal axis resulting in a sinusoidal horizontal sweep. Further, in some embodiments, scanning mirror 162 scans vertically at a nonresonant frequency, so the vertical scan frequency can be controlled independently.

In various embodiments of the present invention, the angular extents and/or offsets of mirror deflection of mirror 162 are modified during operation. For example, the horizontal angular extents may be modified, the vertical angular extents or offset may be modified, or all may be modified. The angular extents and offset may be controlled and modified by signal stimulus received on drive lines 250. This signal stimulus is provided on node 193 by actuating circuits 110 (FIG. 1).

The particular MEMS device embodiment shown in FIG. 2 is provided as an example, and the various embodiments of the invention are not limited to this specific implementation. For example, any scanning mirror capable of sweeping in two dimensions to reflect a light beam in a raster pattern may be incorporated without departing from the scope of the present invention. Also for example, any combination of scanning mirrors (e.g., two mirrors: one for each axis) may be utilized to reflect a light beam in a raster pattern. Further, any type of mirror drive mechanism may be utilized without departing from the scope of the present invention. For example, although MEMS device 160 uses a drive coil on a moving platform with a static magnetic field, other embodiments may include a magnet on a moving platform with drive coil on a fixed platform. Further, the mirror drive mechanism may include an electrostatic or piezoelectric drive mechanism.

Figure 3:
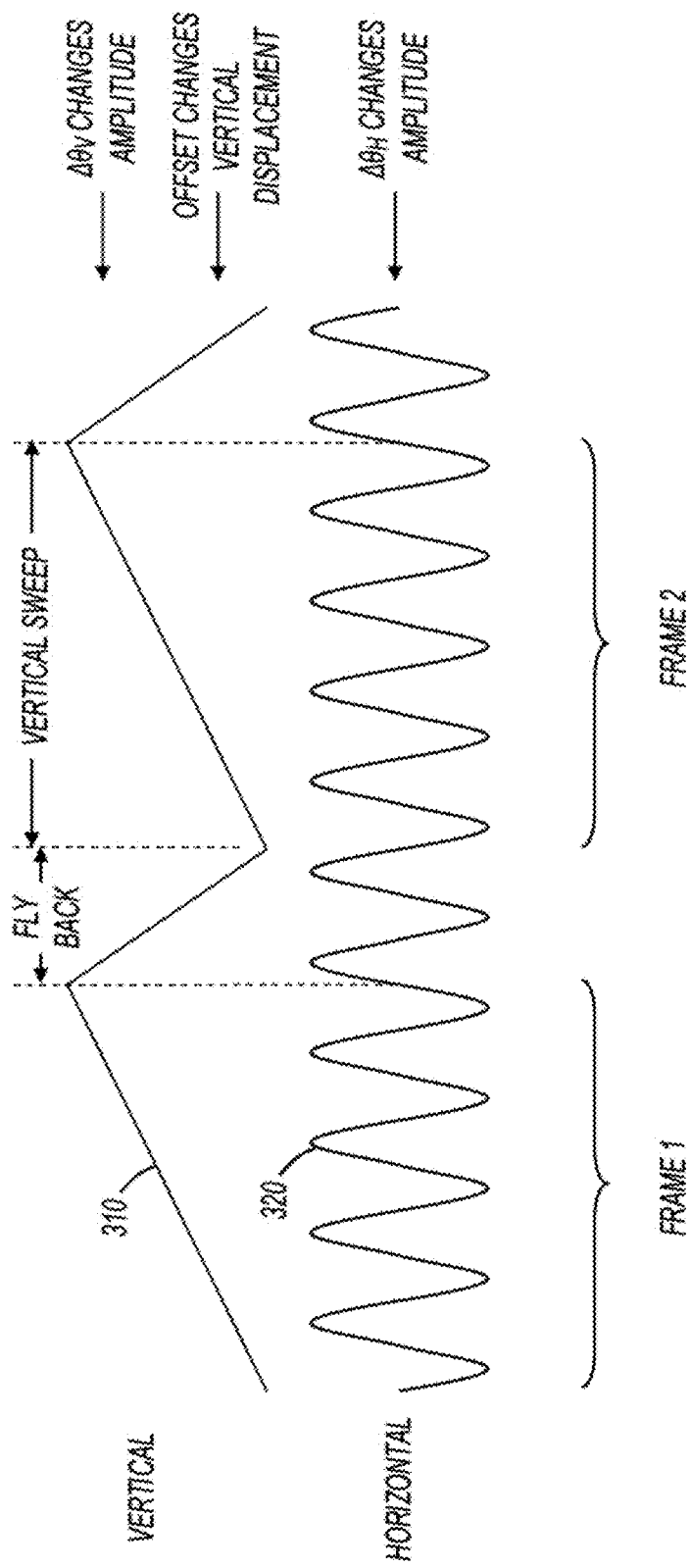
FIG. 3 shows deflection waveforms resulting from a linear vertical sweep and a sinusoidal horizontal sweep.

FIG. 3 shows deflection waveforms resulting from a linear vertical sweep and a sinusoidal horizontal sweep. Vertical deflection waveform 310 is a sawtooth waveform, and horizontal deflection waveform 320 is a sinusoidal waveform. FIG. 3 shows deflection for two frames. As used herein, the term "frame" refers to a time period in which one vertical sweep, and therefore one scan trajectory, takes place. In the example of FIG. 3, the scan trajectories in FRAME 1 and FRAME 2 are the same, resulting in the same sensing field of view in both frames.

Deflection of mirror 162 according to waveforms 310 and 320 may be achieved by driving MEMS device 160 with the appropriate drive signals. In some embodiments, the horizontal deflection frequency is at a resonant frequency of the mirror and a very small excitation at that frequency will result in the desired angular extents. A sawtooth drive signal for the vertical deflection may be derived from a sum of sine waves at various frequencies. The drive signal for the vertical deflection may also be derived from specific points programmed into a waveform generator.

Although a sawtooth drive signal will result in the vertical deflection shown in FIG. 3, other drive signal embodiments exist. For example, in some embodiments, the vertical drive signal may be triangle wave (where subsequent frames are written top to bottom followed by bottom to top alternating each frame) or sinusoidal waveforms. The vertical drive signal may also be other non-linear ramp waveform shapes, for example ones that result in parabolic or hyperbolic non-constant mirror velocity profiles.

Sawtooth vertical deflection waveform 310 includes vertical sweep portions and flyback portions. In some embodiments, laser light pulses are emitted during the vertical sweep portions, and not during the flyback portions. The flyback portions correspond to the beam "flying back" to the top of the sensing field of view.

For clarity of explanation, FIG. 3 shows only a few horizontal cycles per vertical sweep. In practice, many more horizontal cycles are present. For example, a horizontal resonant frequency of 24.5 kHz and a frame rate of 60 Hz will yield about 408 horizontal cycles per vertical sweep. In some embodiments, the frame rate is variable from frame to frame, and the number of horizontal cycles per vertical sweep is also variable from frame to frame. In these embodiments, the sensing field of view may remain constant, while the number of horizontal cycles in the sensing field of view increases.

The amplitude of horizontal deflection waveform 320 corresponds to the horizontal angular extent of mirror deflection. As the amplitude increases, the angular extent of mirror deflection also increases. Referring now back to FIG. 1, as $\theta_H$ increases, actuating circuits 110 provide stimulus to MEMS 160 that causes the amplitude of horizontal deflection waveform 320 to increase. Stated generally, a change in $\theta_H$ ($\Delta\theta_H$) results in a change in the amplitude of the horizontal deflection waveform 320. Similarly, the amplitude of vertical deflection waveform 310 corresponds to the vertical angular extent of mirror deflection. As the amplitude increases, the angular extent of mirror deflection also increases. Referring now back to FIG. 1, as $\theta_V$ increases, actuating circuits 110 provide stimulus to MEMS 160 that causes the amplitude of vertical deflection waveform 310 to increase. Stated generally, a change in $\theta_V$ ($\Delta\theta_V$) results in a change in the amplitude of the vertical deflection waveform 310. The vertical displacement of waveform 310 corresponds to the offset provided by variable sensing field of view controller 140. Referring now back to FIG. 1, as the value of the offset increases, the vertical displacement of waveform 310 and the sensing field of view in space, increases.

Figure 4:
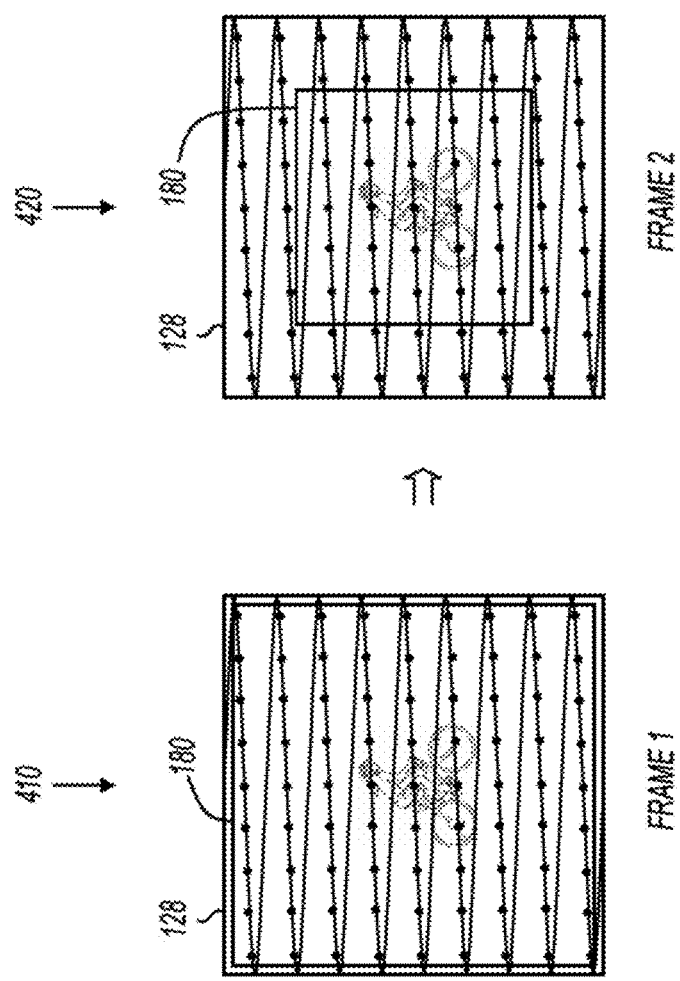
FIGS. 4 and 5 show modifications of imaging and sensing fields of view in accordance with various embodiments of the present invention.
Figure 5:
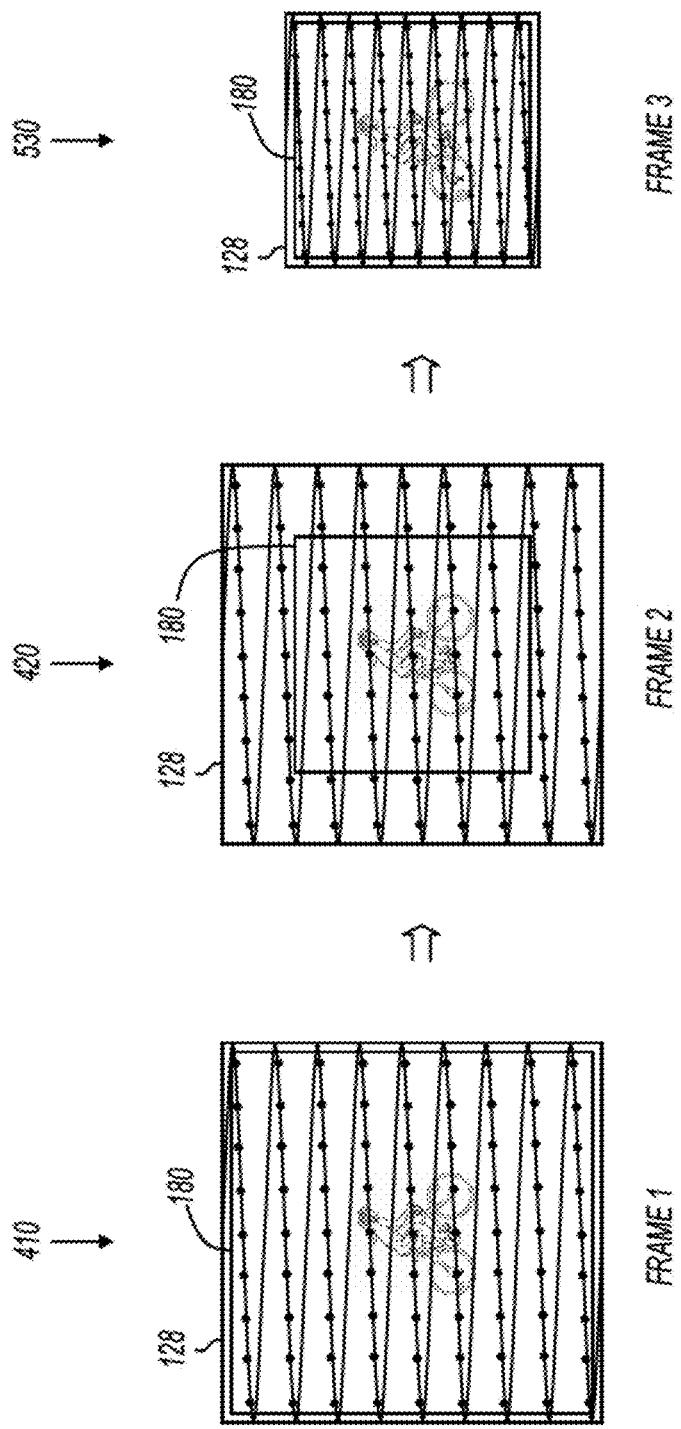

FIGS. 4 and 5 show modifications of imaging and sensing fields of view in accordance with various embodiments of the present invention. FIGS. 4 and 5 show an object (bicycle and rider) to be imaged. As shown in FIG. 4, a first frame 410 includes a sensing field of view 128 and imaging field of view 180 substantially matching in space. A second frame 420 includes an imaging field of view 180 that is smaller than, and completely encompassed by, the sensing field of view 128. As used herein, the terms "substantially matching" and "substantially matched" refer not only to the case in which sensing and imaging fields of view occupy the exact same area, but also to cases in which sensing and imaging fields of view occupy very nearly the exact same area. In some embodiments, sensing and imaging fields of view are substantially matching when their differences are imperceptible to a human eye.

The change in the imaging field of view 180 from the first frame 410 to the second frame 420 may be a result of a change in camera properties. For example, in some embodiments, a digital zoom property of the camera may be changed, resulting in a reduction in size of the imaging field of view 180. Cameras utilizing digital zoom typically take the center of the image and digitally expand it to create a zoomed-in full size image of the center region. In these embodiments, the resolution of the captured visible image may be reduced as a result of the digital zoom. Also in these embodiments, because the angular extents of the scanning have not changed between the two frames, a reduction of resolution of the 3D depth data within the imaging field of view has also occurred. In some embodiments, the reductions in resolution in the visible image and the 3D data are similar such that the result is a digital zoom of the RGB-D data captured prior to the digital zoom of the camera.

Also for example, in some embodiments, an optical zoom property of the camera may be changed, resulting in a reduction in size of the imaging field of view 180 as shown at 420. Cameras utilizing optical zoom typically achieve the zoom function by moving lenses within the camera module to magnify the image. Image quality and image resolution is typically maintained throughout the zoom. In these embodiments, the resolution of the entire captured visible image within the imaging field of view is maintained while a reduction of resolution of the 3D depth data within the imaging field of view has occurred resulting in a mismatch between RGB data density and depth data density within the imaging field of view.

In the example of FIG. 4, the sensing field of view 128 is constant from frame to frame because the angular extents and offset are also constant frame to frame. This corresponds to 3D imaging system operation in accordance with displacement waveforms 310 and 320 shown in FIG. 3.

FIG. 5 shows the first two frames 410 and 420 as shown in FIG. 4, and also includes a third frame 530. The sensing field of view 128 has been modified in frame 530 to substantially match the imaging field of view 180. In some embodiments, this is performed by variable sensing field of view controller 140 (FIG. 1) in response to a change in camera properties. For example, in some embodiments, variable sensing field of view controller 140 may modify angular extents and/or offsets in response to a change in a digital zoom property and/or an optical zoom property of camera 188. When this change is performed in response to an optical zoom property, the relative resolutions of RGB data and depth data is substantially maintained between frames 410 and 530. When this change is performed in response to a digital zoom, the resolution of the depth data is increased relative to the RGB data.

Although FIG. 5 shows the sensing field of view 128 being modified to substantially match the imaging field of view 180, this is not a limitation of the present invention. For example, in some embodiments, the sensing field of view is modified to maintain a particular relative resolution between RGB data and depth data, resulting in a sensing field of view and imaging field of view that do not substantially match in size, shape, and/or location. Also, in some embodiments, sensing field of view 128 may be modified so that it overlaps or continues to overlap imaging field of view 180. In other embodiments, sensing field of view 128 may be modified so that it exactly matches imaging field of view 180. Also for example, in some embodiments, sensing field of view 128 may be modified so that imaging field of view 180 completely encompasses sensing field of view 128, and in other embodiments, sensing field of view 128 may be modified so that sensing field of view 128 completely encompasses imaging field of view 180.

Figure 6:
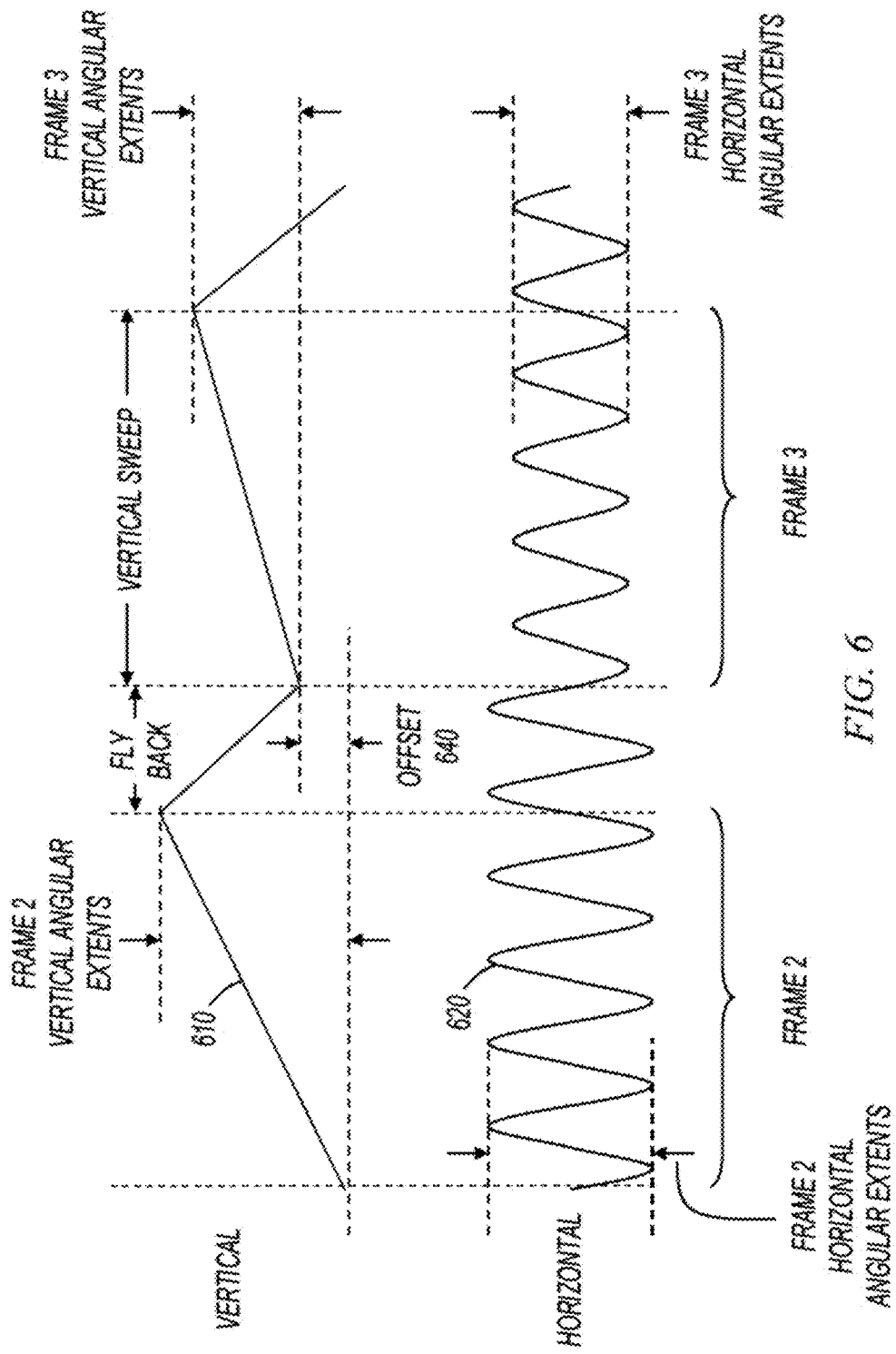
FIG. 6 shows deflection waveforms resulting from operations represented by FIG. 5.

FIG. 6 shows deflection waveforms resulting from operations represented by FIG. 5. The waveforms shown in FIG. 6 represent an example of dynamic modification of vertical angular extents and vertical offset of mirror deflection to modify the sensing field of view. Waveform 610 represents the deflection of the scanning mirror on the vertical axis, and waveform 620 represents the deflection of the scanning mirror on the horizontal axis. Waveforms 610 and 620 are similar to waveforms 310 and 320 (FIG. 3) during FRAME 2, but are modified in FRAME 3 to create a different sensing field of view.

The FRAME 2 angular extents shown in FIG. 6 are the same as the FRAME 2 vertical angular extents shown in FIG. 3; however, the FRAME 3 angular extents shown in FIG. 6 are reduced as compared to the FRAME 2 angular extents shown in FIGS. 3 and 6. In addition, an offset 640 is introduced in FRAME 3 as shown in FIG. 6. As an example and based on the MEMS and drive technology, this offset 640 may be applied as a vertical offset to one of the mirrors in the system or as a resting point bias in a single mirror system. The resulting change in the sensing field of view is illustrated at 530 in FIG. 5.

Although the changes in angular extents and offset are shown frame to frame in FIGS. 4-6, this is not a limitation of the present invention. For example, in some embodiments, the change in angular extents and offset may take place over more than one frame and may take place over many frames.

Figure 7:
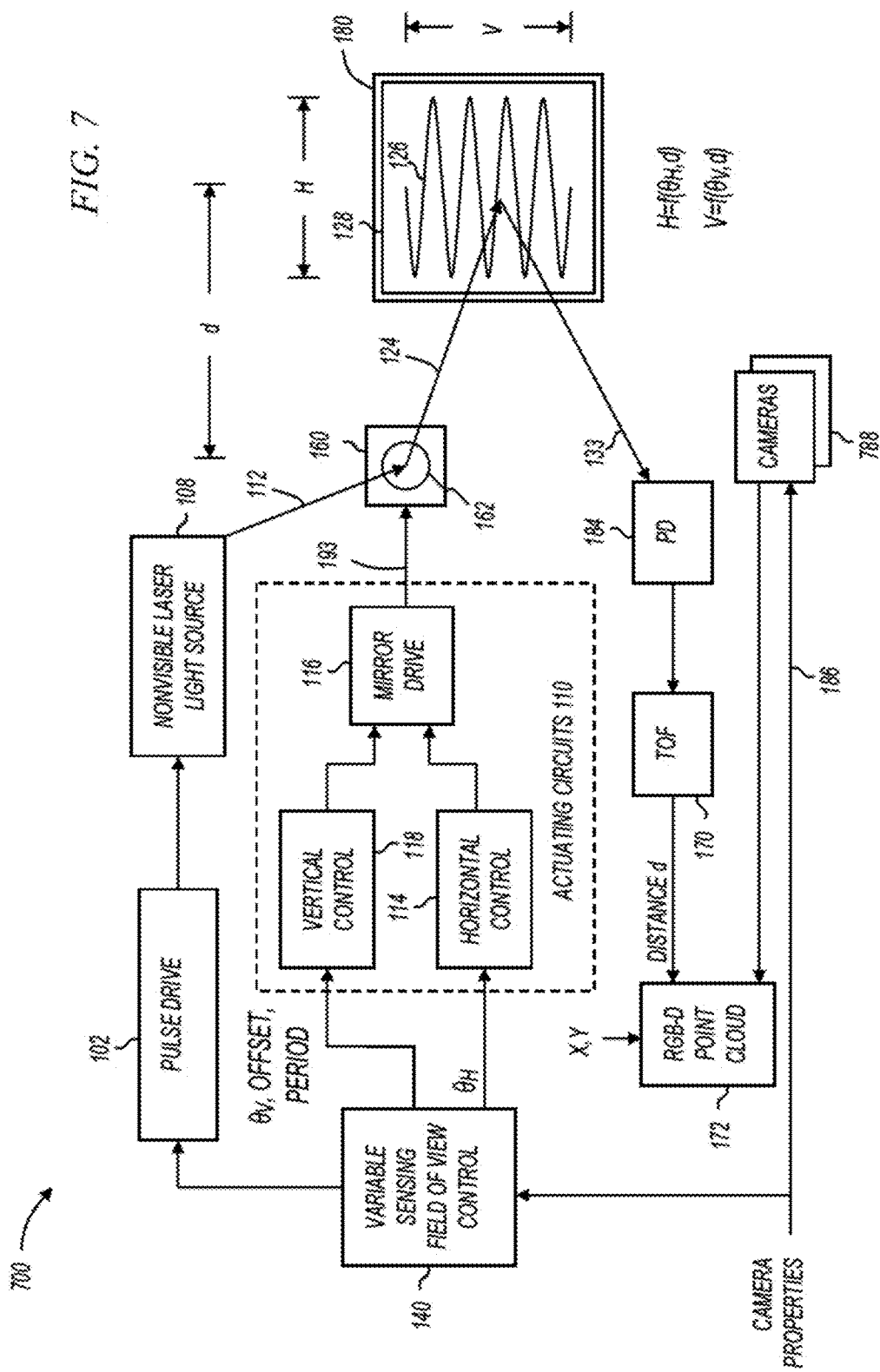
FIG. 7 shows a 3D imaging system with multiple cameras in accordance with various embodiments of the present invention.

FIG. 7 shows a 3D imaging system with multiple cameras in accordance with various embodiments of the present invention. 3D imaging system 700 is similar to 3D imaging system 100 (FIG. 1) with the exception that 3D imaging system 700 includes multiple cameras 788. In some embodiments, cameras 788 have different properties such as focal length, aspect ratio, or the like.

In various embodiments represented by FIG. 7, variable sensing field of view controller 140 may modify angular extents and/or offsets to change the size, shape, or location of sensing field of view 128 in response to changes in camera properties applicable to one or more of cameras 788. For example, variable sensing field of view controller 140 may modify sensing field of view 128 based on camera properties such as an optical zoom level, a digital zoom level, an aspect ratio, an on/off state, or other property of any of cameras 788.

Figure 8:
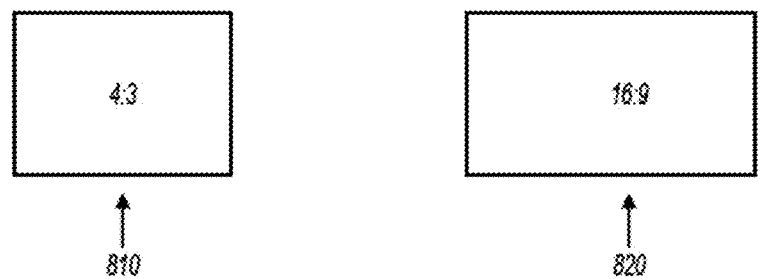
FIG. 8 shows different camera aspect ratios in accordance with various embodiments of the present invention.

FIG. 8 shows different camera aspect ratios in accordance with various embodiments of the present invention. Aspect ratio 810 is shown as 4:3 and aspect ratio 820 is shown as 16:9. In some embodiments, one of cameras 788 (FIG. 7) has aspect ratio 810 and one of cameras 788 has aspect ratio 820. Variable sensing field of view controller 140 (FIG. 7) may modify the sensing field of view in response to which camera is selected, and therefore, which aspect ratio will be used for the imaging field of view. Variable sensing field of view controller 140 may modify the sensing field of view in response other camera properties such as optical and/or digital zoom levels in conjunction with aspect ratio selection.

Figure 9:
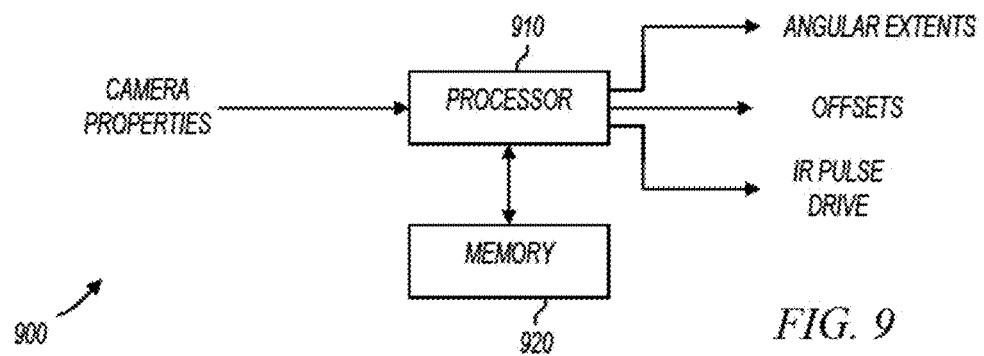
FIG. 9 shows a variable sensing field of view controller in accordance with various embodiments of the present invention.

FIG. 9 shows a variable sensing field of view controller in accordance with various embodiments of the present invention. Controller 900 is an example implementation of variable sensing field of view controller 140 (FIGS. 1, 7). Controller 900 includes processor 910 and memory 920. Memory 920 represents a non-transitory computer-readable medium that stores instructions. When the instructions are executed by processor 910, processor 910 may perform one or more methods corresponding to angular extents determination, offset determination, and pulse power and/or timing determination in response to changes in camera properties.

Figure 10:
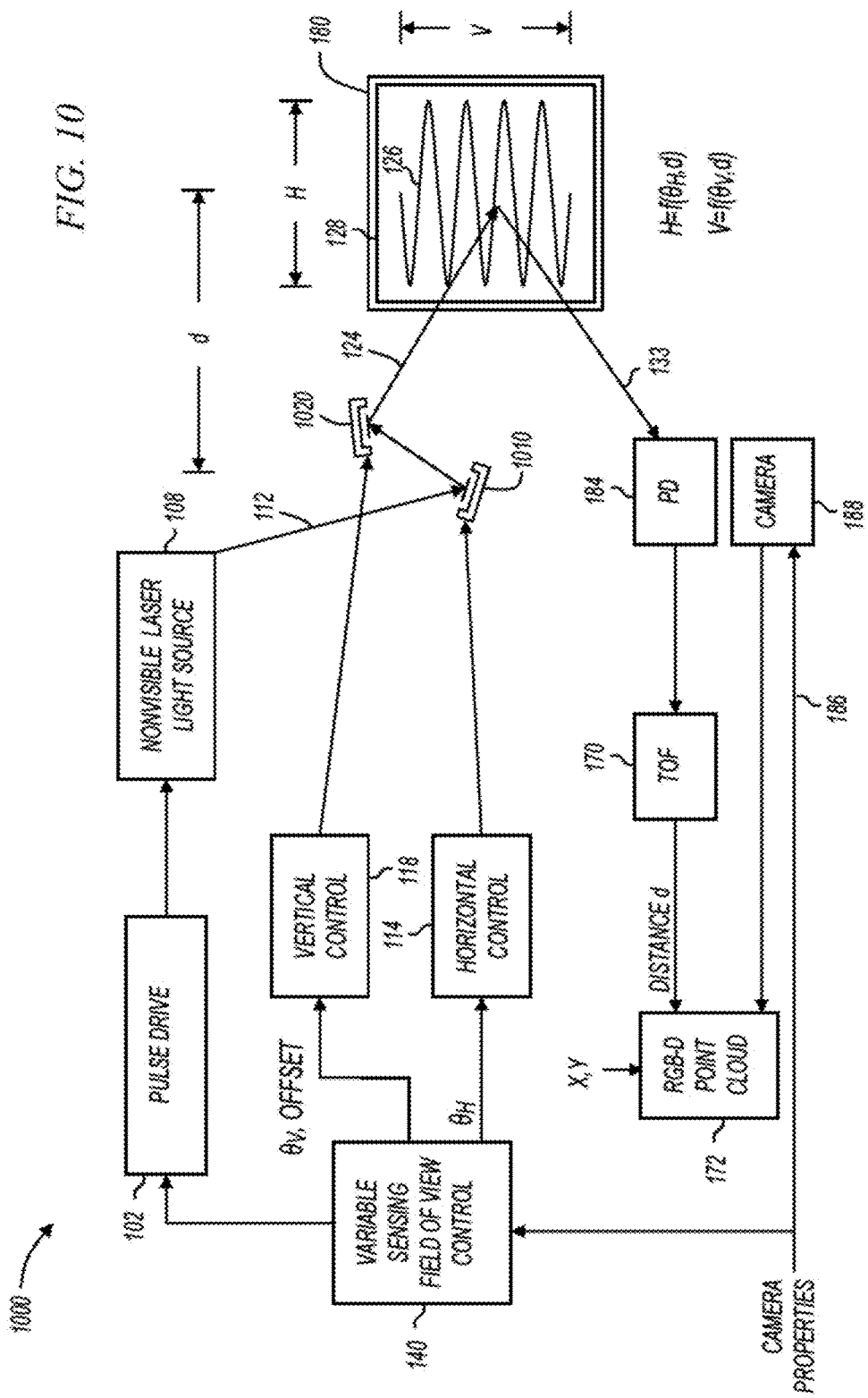
FIG. 10 shows a 3D imaging system in accordance with various embodiments of the present invention.

FIG. 10 shows a 3D imaging system in accordance with various embodiments of the present invention. 3D imaging system 1000 includes pulse drive 102, nonvisible laser light source 108, PD 184, TOF detection circuit 170, camera 188, RGB-D point cloud storage circuit 172, variable sensing field of view controller 140, vertical control component 118, and horizontal control component 114, all of which are described above with reference to previous figures. 3D imaging system 1000 also includes scanning mirrors 1020 and 1010.

Scanning mirrors 1010 and 1020 each scan on one axis. For example, scanning mirror 1010 scans on the horizontal axis and scanning mirror 1020 scans on the vertical axis. Horizontal control component 114 provides signal stimulus to excite movement of scanning mirror 1010 and vertical control component 118 provides signal stimulus to excite movement of scanning mirror 1020.

In embodiments represented by FIG. 10, changes in angular extents and offsets are achieved by modifying stimulus to the scanning mirrors separately. For example, a change in horizontal angular extents may be achieved by modifying the signal stimulus provided horizontal control component 114 to scanning mirror 1010, and a change in vertical angular extents may be achieved by modifying the signal stimulus provided vertical control component 118 to scanning mirror 1020.

Figure 11:
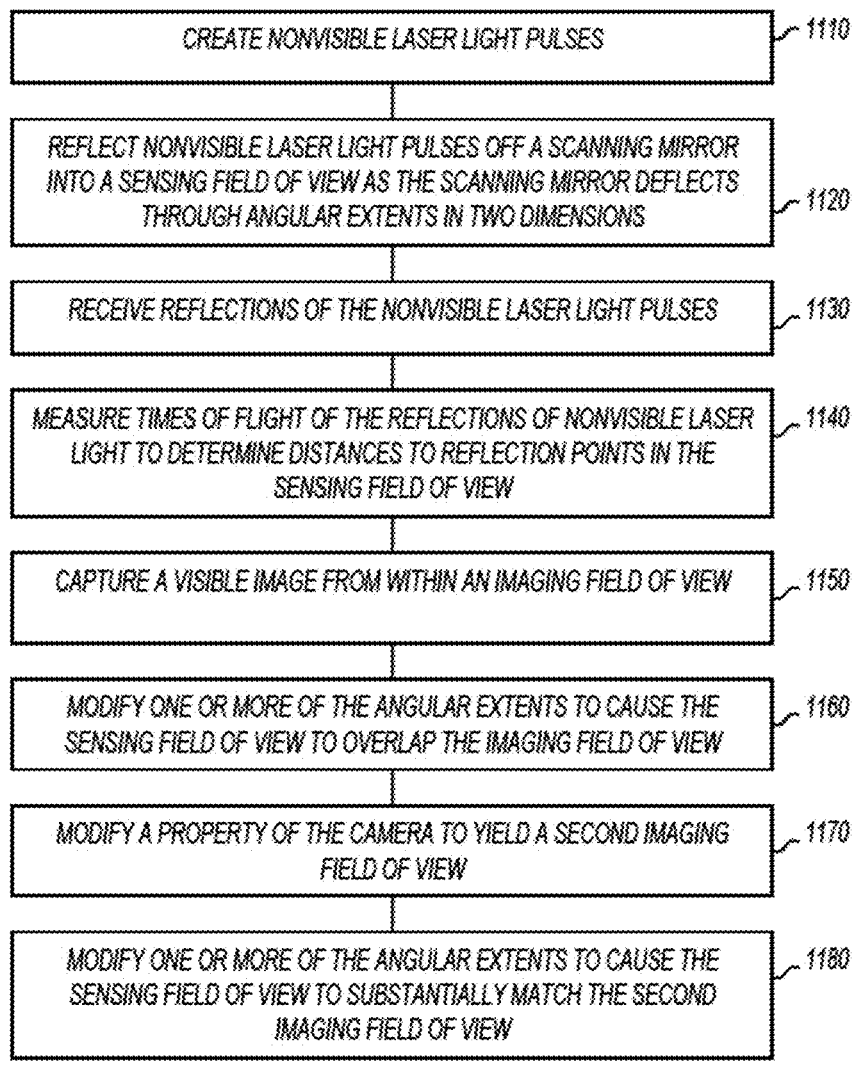
FIG. 11 shows a flow diagram of methods in accordance with various embodiments of the present invention.

FIG. 11 shows a flow diagram of methods in accordance with various embodiments of the present invention. In some embodiments, method 1100, or portions thereof, is performed by a variable sensing field of view controller, embodiments of which are shown in previous figures. Further, in some embodiments, method 1100, or portions thereof, is performed by a 3D imaging system, embodiments of which are shown in previous figures. In other embodiments, method 1100 is performed by a series of circuits or an electronic system. Method 1100 is not limited by the particular type of apparatus performing the method. The various actions in method 1100 may be performed in the order presented, or may be performed in a different order. Further, in some embodiments, some actions listed in FIG. 11 are omitted from method 1100.

Method 1100 is shown beginning with block 1110. As shown at 1110, nonvisible laser light pulses are created. This may correspond to pulse drive circuit 102 commanding nonvisible laser light source 108 to generate infrared laser light pulses. At 1120, the nonvisible laser light pulses are reflected off a scanning mirror into a sensing field of view as the scanning mirror deflects through angular extents in two dimensions. This may correspond to the laser light pulses being reflected off mirror 162 (FIG. 1) or off mirrors 1010 and 1020 (FIG. 10) into a sensing field of view as shown in preceding figures.

At 1130, reflections of the nonvisible laser light pulses are received. This may correspond to PD 184 receiving reflections of the laser light pulses created at 1110 and reflected off reflection points in the field of view.

At 1140, the time of flight of the reflections of nonvisible laser light pulses are measured to determine distances to reflection points within the sensing field of view. This may correspond to TOF detection circuit 170 measuring the TOF of the reflected laser light pulses.

At 1150, a visible image is captured from within an imaging field of view. This may correspond to camera 188 (FIG. 8) or one or more of cameras 788 (FIG. 7) capturing an RGB image from within imaging field of view 180.

At 1160, one or more of the angular extents of mirror deflection are modified to cause the sensing field of view to overlap the imaging field of view. In some embodiments, this corresponds to sensing field of view 128 to overlap with imaging field of view 180. The overlap may be partial or complete, and either the sensing field of view or imaging field of view may be completely encompassed by the other.

At 1170, a property of the camera is modified to yield a second imaging field of view. Example properties include analog and/or digital zoom levels, aspect ratio, on/off state, and the like.

At 1180, one or more of the angular extents are modified to cause the sensing field of view to substantially match the second imaging field of view. In some embodiments, this may correspond to the size, shape, and/or location of the sensing field of view being modified to match a modified zoom level of the camera, and in other embodiments, this may correspond to the size, shape, and/or location of the sensing field of view being modified to match a modified aspect ratio or camera selection.

Figure 12:
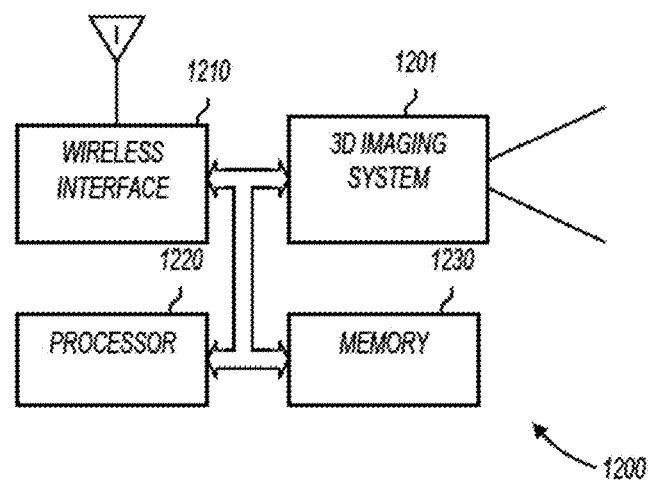
FIG. 12 shows a block diagram of a mobile device in accordance with various embodiments of the present invention.

FIG. 12 shows a block diagram of a mobile device in accordance with various embodiments of the present invention. As shown in FIG. 12, mobile device 1200 includes wireless interface 1210, processor 1220, memory 1230, and 3D imaging system 1201. 3D imaging system 1201 may include any of the 3D imaging system described herein. For example, 3D imaging system 1201 may dynamically modify angular extents and offsets to change the size, shape, or location of sensing fields of view as described above.

Wireless interface 1210 may include any wireless transmission and/or reception capabilities. For example, in some embodiments, wireless interface 1210 includes a network interface card (NIC) capable of communicating over a wireless network. Also for example, in some embodiments, wireless interface 1210 may include cellular telephone capabilities. In still further embodiments, wireless interface 1210 may include a global positioning system (GPS) receiver. One skilled in the art will understand that wireless interface 1210 may include any type of wireless communications capability without departing from the scope of the present invention.

Processor 1220 may be any type of processor capable of communicating with the various components in mobile device 1200. For example, processor 1220 may be an embedded processor available from application specific integrated circuit (ASIC) vendors, or may be a commercially available microprocessor. In some embodiments, processor 1220 retrieves RGB-D data from 3D imaging system 1201. The RGB-D data may be provided to wireless interface 1210.

Memory 1230 may includes any type of memory storage device capable of storing processor instructions and/or data. For example, in some embodiments, memory 1230 may be a nontransitory storage device capable of storing instructions that are executable by processor 1220. Also for example, memory 1230 may store retrieved RGB-D data and/or intermediate results produced by processor 1220 when performing method embodiments of the present invention.

Figure 13:
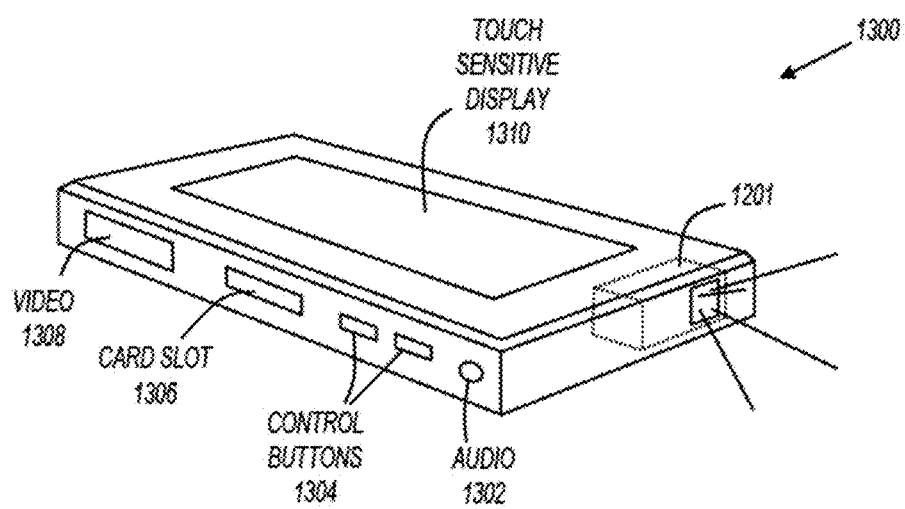
FIG. 13 shows a mobile device in accordance with various embodiments of the present invention.

FIG. 13 shows a mobile device in accordance with various embodiments of the present invention. Mobile device 1300 may be a hand held 3D imaging system with or without communications ability. For example, in some embodiments, mobile device 1300 may be a 3D imaging system with little or no other capabilities. Also for example, in some embodiments, mobile device 1300 may be a device usable for communications, including for example, a cellular phone, a smart phone, a tablet computing device, a global positioning system (GPS) receiver, or the like. Further, mobile device 1300 may be connected to a larger network via a wireless (e.g., cellular), or this device can accept and/or transmit data messages or video content via an unregulated spectrum (e.g., WiFi) connection.

Mobile device 1300 includes 3D imaging system 1201, touch sensitive display 1310, audio port 1302, control buttons 1304, card slot 1306, and audio/video (A/V) port 1308. None of these elements are essential. For example, mobile device 1300 may only include 3D imaging system 1201 without any of touch sensitive display 1310, audio port 1302, control buttons 1304, card slot 1306, or A/V port 1308. Some embodiments include a subset of these elements. For example, an accessory device may include 3D imaging system 1201, control buttons 1304 and display 1310. A smartphone embodiment may combine a cellular telephone and scanning projector functionality.

Touch sensitive display 1310 may be any type of display. For example, in some embodiments, touch sensitive display 1310 includes a liquid crystal display (LCD) screen. In some embodiments, display 1310 is not touch sensitive. Display 1310 may display the 3D image captured 3D imaging system 1201. Some embodiments may include a keypad in addition to touch sensitive display 1310.

A/V port 1308 accepts and/or transmits video and/or audio signals. For example, A/V port 1308 may be a digital port, such as a high definition multimedia interface (HDMI) interface that accepts a cable suitable to carry digital audio and video data. In some embodiments, mobile device 1300 may be tethered to an external storage device through A/V port 1308, and mobile device 1300 may provide 3D imagery to the external device using A/V port 1308.

Audio port 1302 provides audio signals. For example, in some embodiments, mobile device 1300 is a media recorder that can record and store audio and video. In these embodiments, the video may be captured by 3D imaging system 1201 and the audio may be captured at audio port 1302.

Mobile device 1300 also includes card slot 1306. In some embodiments, a memory card inserted in card slot 1306 may be used to store 3D imagery captured by 3D imaging system 1201. Card slot 1306 may receive any type of solid state memory device, including for example secure digital (SD) memory cards.

Figure 14:
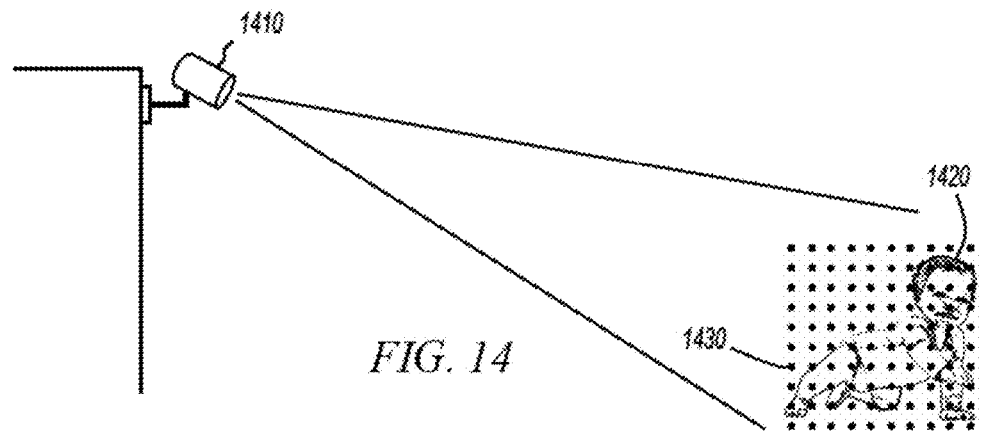
FIG. 14 shows a security camera that includes a 3D imaging system.

FIG. 14 shows a security camera 1410 that includes a 3D imaging system. In some embodiments, security camera 1410 may detect and classify objects detected in a field of view using an array of TOF detection points 1430 as well as visible imagery as describe above. For example, in a residential security application, security camera 1410 may detect an object and then classify the object as either human or nonhuman.

Figure 15:
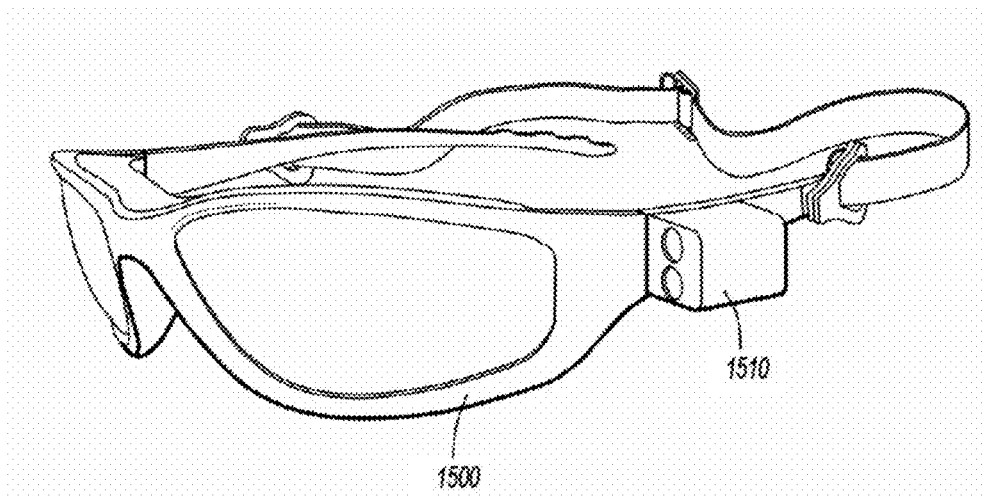
FIG. 15 shows a wearable 3D imaging system in accordance with various embodiments of the invention.

FIG. 15 shows a wearable 3D imaging system in accordance with various embodiments of the invention. In the example of FIG. 15, the wearable 3D imaging system 1500 is in the form of eyeglasses, but this is not a limitation of the present invention. For example, the wearable 3D imaging system may be a hat, headgear, worn on the arm or wrist, or be incorporated in clothing. The wearable 3D imaging system 1500 may take any form without departing from the scope of the present invention.

Wearable 3D imaging system 1500 includes 3D imaging device 1510. 3D imaging device 1510 creates a RGB-D point cloud by combining TOF measurement and with visible imagery as described above. For example, 3D imaging device 1510 may include any of the 3D imaging system embodiments described herein.

In some embodiments, wearable 3D imaging system 1500 provides feedback to the user that is wearing the system. For example, a head up display may be incorporated to overlay 3D images with data to create a virtual reality, an augmented reality. Further, tactile feedback may be incorporated in the wearable 3D imaging device to provide interaction with the user.

Figure 16:
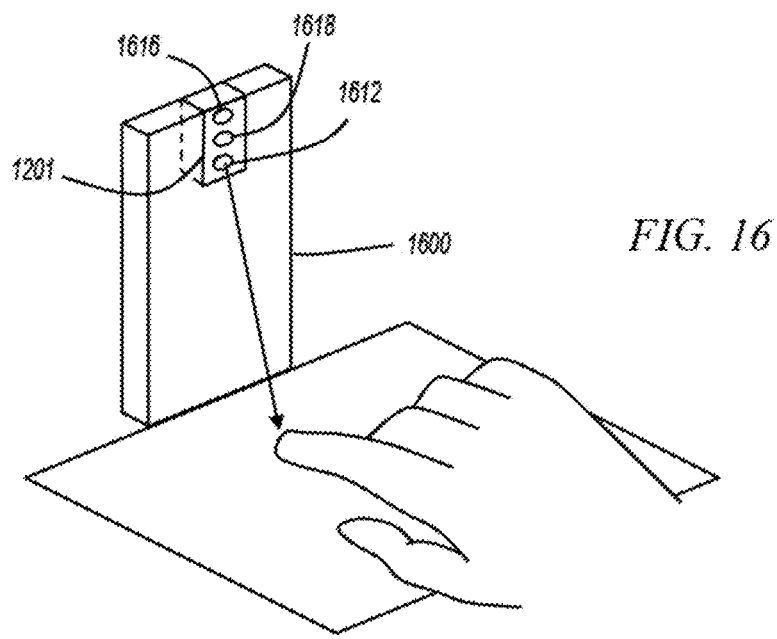
FIG. 16 shows a tabletop 3D imaging system in accordance with various embodiments of the present invention.

FIG. 16 shows a tabletop 3D imaging system in accordance with various embodiments of the present invention. Tabletop 3D imaging system 1600 includes 3D imaging system 1201, which in turn includes scanning device 1612, photodetector 1618, and camera 1616. In some embodiments, 3D imaging device 1201 is implemented as 3D imaging system 100 (FIG. 1). In operation, tabletop 3D imaging system 1600 may be used for an interactive tabletop or kitchen counter application where the RGB-D data may be utilized for fast gesture and virtual touch detection for interactivity, as well as for making accurate volumetric measurements or models of objects on the table.

Figure 17:
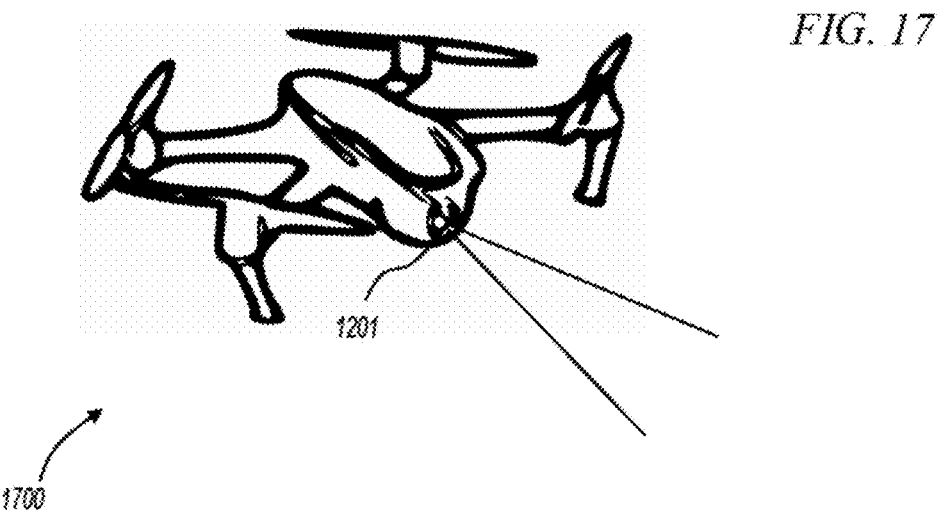
FIG. 17 shows a drone in accordance with various embodiments of the present invention.

FIG. 17 shows a drone in accordance with various embodiments of the present invention. Drone 1700 includes 3D imaging system 1201. In operation, drone 1700 may modify angular extents and offsets to change the size, shape, and/or location of sensing fields of view in relation to imaging fields of view as described above. For example, drone 1700 may detect an object in the sky or on the ground, and then modify both an imaging field of view and sensing field of view to increase the resolution of visible imagery and to increase the density of reflection points in an area around the object.

Figure 18:
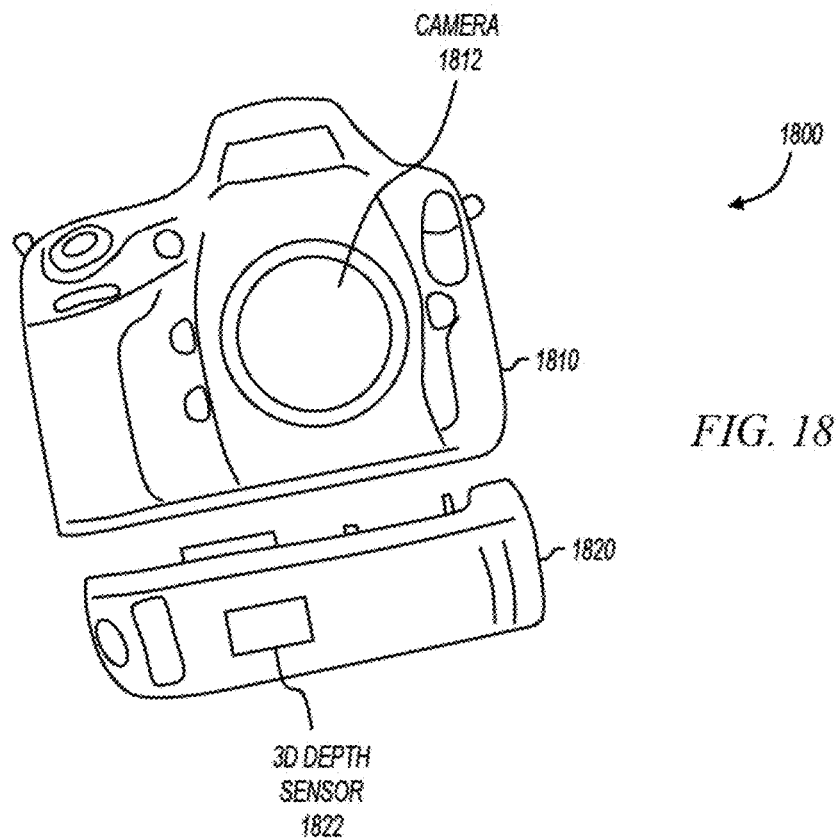
FIGS. 18 and 19 show 3D imaging systems in accordance with various embodiments of the present invention.
Figure 19:
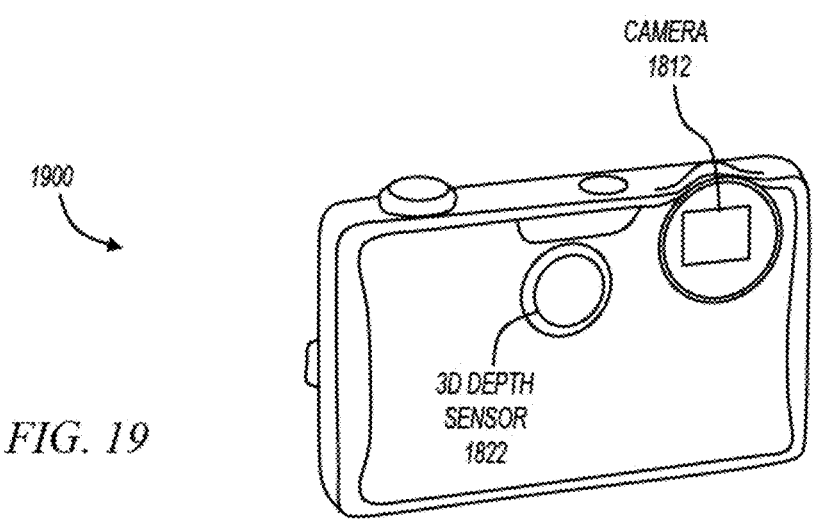

FIGS. 18 and 19 show 3D imaging systems in accordance with various embodiments of the present invention. FIG. 18 shows system 1800, which includes an example embodiment of any of the 3D imaging systems described herein, including system 100 (FIG. 1), system 700 (FIG. 7), or system 1000 (FIG. 10). System 1800 includes a housing 1810 that includes camera 1812, and a removable module 1820 that includes 3D depth sensor 1822. Camera 1812 may be any of the camera embodiment described herein, including multiple cameras. For example, camera 1812 may be camera 188 (FIG. 1) or cameras 788 (FIG. 7). 3D depth sensor 1822 may include laser light sources, scanning devices, photodetectors, TOF measurement circuits and other system components that support generating a 3D point cloud. Examples are described with reference to previous figures. In some embodiments, all of the system components that support generating an RGB-D point cloud besides the camera are housed in removable module 1820. In other embodiments, some of the system components are housed in housing 1810 and some are housed in removable module 1820. In still further embodiments, some or all of the system components are duplicated in housing 1810 and removable module 1820.

FIG. 19 shows system 1900, which includes an example embodiment of any of the 3D imaging systems described herein, including system 100 (FIG. 1), system 700 (FIG. 7), or system 1000 (FIG. 10). System 1900 is an example 3D imaging system that includes camera 1812 and 3D depth sensor 1822 in a common housing.

3D imaging systems described herein have many additional applications. For example, various embodiments of the present invention may be included in automobiles for the purposes of occupancy detection, sleep/gaze detection, gesture detection, interaction, communication, and the like. Also for example, various embodiments of the present invention may be included in cameras and security or surveillance devices such as home security devices, smart cameras, IP cameras, and the like.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A 3D imaging system comprising:
   a first laser light source to emit nonvisible laser light pulses;
   a scanning mirror to reflect and scan the nonvisible laser light pulses in a sensing field of view;
   a mirror actuating circuit to drive the scanning mirror with signals that cause the scanning mirror to deflect through angular extents in two dimensions within the sensing field of view;
   a photodetector to detect reflections of nonvisible laser light pulses from a plurality of reflection points within the sensing field of view;
   a time-of-flight (TOF) detection circuit responsive to the photodetector to measure distances from the 3D imaging system to the plurality of reflection points;
   a camera to capture a visible image from within an imaging field of view; and
   a control circuit to drive the mirror actuating circuit modify the sensing field of view to change an amount of overlap with the imaging field of view, wherein the control circuit modifies the sensing field of view to change the amount of overlap with the imaging field of view by modifying an offset to the angular extents of deflection of the scanning mirror.

2. The 3D imaging system of claim 1 wherein the control circuit modifies the sensing field of view to change the amount of overlap with the imaging field of view responsive to a zoom level of the camera.

3. The 3D imaging system of claim 1 wherein the control circuit further modifies the sensing field of view to change the amount of overlap with the imaging field of view by modifying the angular extents of deflection of the scanning mirror.

4. The 3D imaging system of claim 1 wherein the control circuit modifies the sensing field of view to change the amount of overlap with the imaging field of view by modifying a size and location of the sensing field of view to substantially match a size and location of the imaging field of view.

5. The 3D imaging system of claim 4 wherein the control circuit is coupled to be responsive to an optical zoom level of the camera.

6. The 3D imaging system of claim 1 further comprising a second camera having a second imaging field of view, wherein the control circuit modifies the sensing field of view to change the amount of overlap with the imaging field of view by modifying a size and location of the sensing field of view to substantially match a size and location of the second imaging field of view.

7. The 3D imaging system of claim 6 wherein the imaging field of view of the camera and the second imaging field of view of the second camera have different aspect ratios.

8. A 3D imaging system comprising:
a camera to capture visible images;
a pulsed light source to create laser light pulses;
at least one scanning mirror to reflect the laser light pulses into a field of view as the at least one scanning mirror is deflected with variable angular extents and variable offset to provide a variable sensing field of view; and
a control circuit to determine the variable angular extents and variable offset to modify the variable sensing field of view to change an amount of overlap with an imaging field of view of a camera.

9. The 3D imaging system of claim 8 wherein the control circuit causes the variable extents and variable offset of the scanning mirror to modify the variable sensing field of view to change an amount of overlap with an imaging field of view of the camera such that the variable sensing field of view substantially matches the imaging field of view of the camera.

10. The 3D imaging system of claim 8 wherein the camera includes an aspect ratio of the camera, and the control circuit causes the variable extents and variable offset of the scanning mirror to modify the variable sensing field of view to change an amount of overlap with an imaging field of view of the camera such that the variable sensing field of view such that the variable sensing field of view substantially matches the aspect ratio of the camera.

11. The 3D imaging system of claim 8 wherein a property of the camera includes a zoom level of the camera, and wherein the control circuit causes the variable extents and variable offset of the scanning mirror to modify the variable sensing field of view to change an amount of overlap with an imaging field of view of the camera such that the variable sensing field of view matches the imaging field of view as the zoom level of the camera changes.

12. The 3D imaging system of claim 11 wherein the zoom level of the camera comprises an optical zoom.

13. The 3D imaging system of claim 11 wherein the zoom level of the camera comprises a digital zoom.

14. The 3D imaging system of claim 11 wherein the at least one scanning mirror comprises a first scanning mirror to deflect in a first dimension and a second scanning mirror to deflect in a second dimension.

15. The 3D imaging system of claim 7 further comprising a second camera, and wherein the control circuit is responsive to a property of the second camera.

16. The 3D imaging system of claim 15 wherein the property of the second camera includes an aspect ratio.

17. A method comprising:
creating nonvisible laser light pulses;
reflecting the nonvisible laser light pulses off a scanning mirror into a sensing field of view as the scanning mirror deflects through angular extents in two dimensions;
receiving reflections of the nonvisible laser light;
measuring a time-of-flight (TOF) of the reflections of nonvisible laser light to determine distances to reflection points in the sensing field of view;
capturing a visible image from within an imaging field of view of a camera; and
modifying one or more of the angular extents and an offset to the angular extents of the scanning mirror to modify the sensing field of view to change an amount of overlap with the imaging field of view.

18. The method of claim 17 wherein the modifying one or more of the angular extents and the offset to the angular extents of the scanning mirror to modify the sensing field of view to change the amount of overlap with the imaging field of view comprising modifying the sensing field of view to substantially match the imaging field of view of the camera.

19. The method of claim 17 further comprising:
modifying a zoom level of the camera to yield a second imaging field of view; and
modifying one or more of the angular extents to modify the sensing field of view to substantially match the second imaging field of view.

* * * * *